Patented June 6, 1933

1,912,939

UNITED STATES PATENT OFFICE

ERNST ALFRED HAUSER, OF FRANKFORT-ON-THE-MAIN, GERMANY, ASSIGNOR TO REVERTEX LIMITED, OF LONDON, ENGLAND, A CORPORATION OF ENGLAND

PROCESS FOR PRODUCING WASHINGPROOF DYEINGS OF PRODUCTS MANUFACTURED FROM AQUEOUS RUBBER DISPERSIONS

No Drawing. Application filed December 17, 1931, Serial No. 581,778, and in Germany September 4, 1931.

This invention relates to a process for producing washing-proof dyeings of products manufactured from aqueous rubber dispersions.

As is known, it has not hitherto been found possible to produce washing-proof dyeings of products, such as the shells of collapsible boats, bedding materials, raincoat fabrics and the like, manufactured from aqueous dispersions of rubber, notwithstanding the existence of an urgent necessity for such dyeings in practice, by reason of the considerable advantages in other respects of the employment of latex, for example, over solutions of rubber in organic solvents.

It has now been ascertained that, by adopting a certain procedure, washing-proof dyeings with known dyestuffs can be produced with products manufactured from aqueous rubber dispersions of any kind, such as natural preserved, concentrated, vulcanized and synthetic latex, and other aqueous dispersions of rubber, old rubber or regenerated rubber. According to the invention, this can be accomplished by incorporating the dyestuffs, in the form of a specially prepared solution with the aqueous rubber dispersions.

The dyestuff solution must be prepared by finely distributing the dyestuff in raw rubber, reclaim and the like, by mechanical means, such as rolling, and bringing the resulting mixture into solution in a solvent such as benzine, benzole, paraffin oil or the like. When using solvents, which are apt to cause coagulation of the latex as for example benzine, benzole and the like coagulation-retarding substances such as ox gall, sulphonic salts and the like, to the extent for example, of 1 to 2% referred to the amount of solvent are added to the solution.

If such solutions be incorporated with aqueous rubber dispersions, a satisfactory and perfectly uniform distribution of the dyestuff in the dispersion is obtained. On then evaporating the water contained in the dispersion, a thoroughly and uniformly dyed, completely wash-proof film or other products such as coatings on fabrics, and the like made from the dispersions, will be obtained.

As exhaustive experiments have demonstrated, these unexpected results are attributable to the circumstance that each particle of dyestuff remains after the removal of the dispersive agent surrounded by a tenuous envelope of masticated rubber, which protects the dyestuff particles from the action of water and the like.

The aforesaid incorporation of dyestuffs in rubber by rolling, is known in itself. It is employed in the case of dyestuffs intended for use in the rubber industry, and is mainly employed with the object of dispensing with the often troublesome manipulation of dyestuffs in the form of powder or paste, but also in order to utilize the increased tinctorial power resulting from the improved distribution obtained. In themselves, however, dyestuffs thus incorporated by rolling are out of the question for dyeing aqueous rubber dispersions, or products manufactured therefrom, since, in this form, they cannot be distributed in the said dispersions.

In addition to completely satisfactory distribution of the dyestuffs and the production of washing-proof dyeings—even in the case of water-soluble dyestuffs—the present invention affords the important advantage that owing to the resulting fine distribution of the dyestuff, the amount of the latter needed to produce a given shade of colour is considerably smaller—for example only about one-tenth—than is required when the dyestuff is added per se.

The two following compositions may be given by way of illustration of the invention.

*Example 1*

100 g. of crepe rubber are intimately mixed on the rolls with 50 g. of Du Pont rubber red RL (powder). The mixture thus obtained is dispersed in 700 g. of benzol to which had been added 22 g. of ox gall (reckoned as dry substance). 20 g. of this dispersion are then added to a mixture consisting of 130 g. of a concentrated rubber latex containing 75% total solids (such as Revertex)
4 g. of ZnO
2 g. of sulphur 1 g. of the Du Pont accelerator Thionex (tetramethyl thiurammonosulfide).

The resulting mixture is then ready for use, for example as coating composition.

*Example 2*

A mixture obtained by incorporating on the masticator 50 g. of ultramarine into 50 g. of crepe rubber is dispersed in 900 g. of paraffin oil. 35 g. of this dispersion are then added to the following mixture 130 g. of a concentrated rubber latex containing 75% total solids (such as Revertex)
2 g. of ZnO
1 g. of sulphur
1 g. of the Du Pont accelerator 833 (aldehyde-amine).

With the resulting mixture coatings, toys, bathing caps and the like can be produced which are absolutely washing-proof.

I claim:

1. A process for the production of washing-proof dyeings of products manufactured from aqueous rubber dispersions which comprises incorporating with the rubber dispersions, known dyestuffs in the form of a solution prepared by finely distributing the dyestuff in rubber and the like by mechanical means, such as rolling, and dissolving the resulting mixture in a solvent, such as benzine, benzole, paraffin oil or the like.

2. A process for the production of washing-proof dyeings of products manufactured from a aqueous rubber dispersions which comprises incorporating with the rubber dispersions, known dyestuffs in the form of a solution which is treated with substances that retard coagulation—such as ox gall and the like—and is prepared by finely distributing the dyestuff in rubber and the like by mechanical means, such as rolling, and dissolving the resulting mixture in a solvent, such as benzine, benzole, paraffin oil or the like.

In testimony whereof, I affix my signature.

ERNST ALFRED HAUSER.